United States Patent [19]
McGrevy

[11] Patent Number: 5,539,857
[45] Date of Patent: Jul. 23, 1996

[54] HEATER BLOCK FOR INJECTION MOLDING WITH REMOVABLE HEAT CONDUCTIVE MEMBER IN GROOVE IN HEATER BLOCK

[75] Inventor: Alan N. McGrevy, Chino, Calif.

[73] Assignee: Caco Pacific Corporation, Covina, Calif.

[21] Appl. No.: 186,281

[22] Filed: Jan. 24, 1994

[51] Int. Cl.⁶ .................................. H05B 3/00; F24H 1/00
[52] U.S. Cl. ........................ 392/484; 219/536; 219/544; 219/546; 219/540; 338/311; 338/252; 338/232
[58] Field of Search ................................. 392/484, 470; 607/105, 104, 107; 165/170, 159, 160; 128/203.27, 204.17; 219/536–537, 524, 525, 530, 540, 546, 544, 467, 458, 457; 338/311, 228, 232, 252; 373/127, 128–131; 29/611

[56] References Cited

U.S. PATENT DOCUMENTS

| | | | |
|---|---|---|---|
| 522,718 | 7/1894 | Leonard | 219/540 |
| 885,769 | 4/1908 | Low et al. | 219/544 |
| 1,116,586 | 11/1914 | Hadaway, Jr. | 219/530 |
| 1,460,259 | 6/1923 | Lindemann | 219/536 |
| 1,703,640 | 2/1929 | Schmidt-Predari | 219/544 |
| 2,744,946 | 5/1956 | Lewicki | 373/130 |
| 2,747,070 | 5/1956 | Bargehr | 219/540 |
| 2,875,312 | 2/1959 | Norton . | |
| 2,987,300 | 6/1961 | Greene . | |
| 3,105,229 | 9/1963 | Sturm | 338/252 |
| 3,314,573 | 4/1967 | Newton . | |
| 3,318,481 | 5/1967 | Phillips et al. . | |
| 3,387,653 | 6/1968 | Coe | 219/536 |
| 3,531,023 | 9/1970 | Mercer . | |
| 3,867,562 | 2/1975 | Fischer et al. | 338/230 |
| 4,115,918 | 9/1978 | Anderl et al. | 29/611 |
| 4,222,733 | 9/1980 | Gellert et al. . | |
| 4,256,584 | 3/1981 | Lord et al. . | |
| 4,280,908 | 7/1981 | Lord et al. . | |
| 4,343,988 | 8/1982 | Roller et al. | 219/530 |
| 4,417,675 | 11/1983 | Abt et al. . | |
| 4,449,915 | 5/1984 | van den Brink . | |
| 4,460,819 | 7/1984 | Eugster . | |
| 4,465,922 | 8/1984 | Kolibas . | |
| 4,493,972 | 1/1985 | Steinel et al. . | |
| 4,530,654 | 7/1985 | Rose . | |
| 4,609,138 | 9/1986 | Harrison . | |
| 4,702,689 | 10/1987 | Schmidt et al. . | |
| 4,705,473 | 11/1987 | Schmidt . | |

(List continued on next page.)

FOREIGN PATENT DOCUMENTS

| | | | |
|---|---|---|---|
| 112371 | 1/1941 | Australia | 29/611 |
| 219732 | 7/1961 | Austria | 29/611 |
| 622524 | 11/1935 | Germany | 219/457 |
| 213595 | 2/1941 | Switzerland | 219/536 |

Primary Examiner—John A. Jeffery
Attorney, Agent, or Firm—Ellsworth R. Roston; Charles H. Schwartz

[57] ABSTRACT

A heating block made from a heat conductive material has a passage through which a fluid heated by the heater can flow. A groove preferably having a looped configuration extends into the block from a peripheral surface in the block. A heater made from an electrically conductive and heat conductive material is disposed in the groove, preferably in a looped configuration corresponding to the looped configuration of the groove. A heat conductive member disposed in the groove is provided with a hole to receive the heater in an enveloping relationship. The member may be defined by a pair of separable portions. The member is preferably disposed in the looped relationship in the groove. Localized deformation of the heating block holds the member and the heater in a fixed relationship with the block. The heater may deteriorate or become defective with extended usage and may have to be replaced. To accomplish this, the heater and the member may be removed as a unit from the block after removing the deformation. The portions in the member are separated to remove the heater. A new heater may then be disposed between the split portions which may then be abutted. The member and the heater may then be disposed as a unit in the groove and the local deformation may be reinstated in the block to retain the member and the heater in a fixed relationship with the block.

28 Claims, 3 Drawing Sheets

U.S. PATENT DOCUMENTS

| | | |
|---|---|---|
| 4,712,995 | 12/1987 | Basnett . |
| 4,729,733 | 3/1988 | Schmidt . |
| 4,740,151 | 4/1988 | Schmidt et al. . |
| 4,747,770 | 5/1988 | Schmidt . |
| 4,755,131 | 7/1988 | Schmidt . |
| 4,768,945 | 9/1988 | Schmidt et al. . |
| 4,771,534 | 9/1988 | Gellert et al. . |
| 4,772,778 | 9/1988 | Ogawa . |
| 4,793,795 | 12/1988 | Schmidt et al. . |
| 4,810,184 | 3/1989 | Gellert et al. . |
| 4,818,217 | 4/1989 | Schmidt et al. . |
| 4,917,594 | 4/1990 | Gellert et al. . |
| 4,981,431 | 1/1991 | Schmidt . |
| 5,000,675 | 3/1991 | Gellert et al. . |
| 5,002,480 | 3/1991 | Gellert et al. . |
| 5,004,416 | 4/1991 | van den Brink . |
| 5,007,821 | 4/1991 | Schmidt . |
| 5,022,846 | 6/1991 | Schmidt . |
| 5,028,227 | 7/1991 | Gellert et al. . |
| 5,030,084 | 7/1991 | Gellert et al. . |
| 5,104,307 | 4/1992 | van den Brink . |
| 5,113,576 | 5/1992 | van Boekel et al. . |
| 5,142,126 | 8/1992 | Teng . |
| 5,226,596 | 7/1993 | Okamura . |
| 5,227,181 | 7/1993 | Knudsen . |

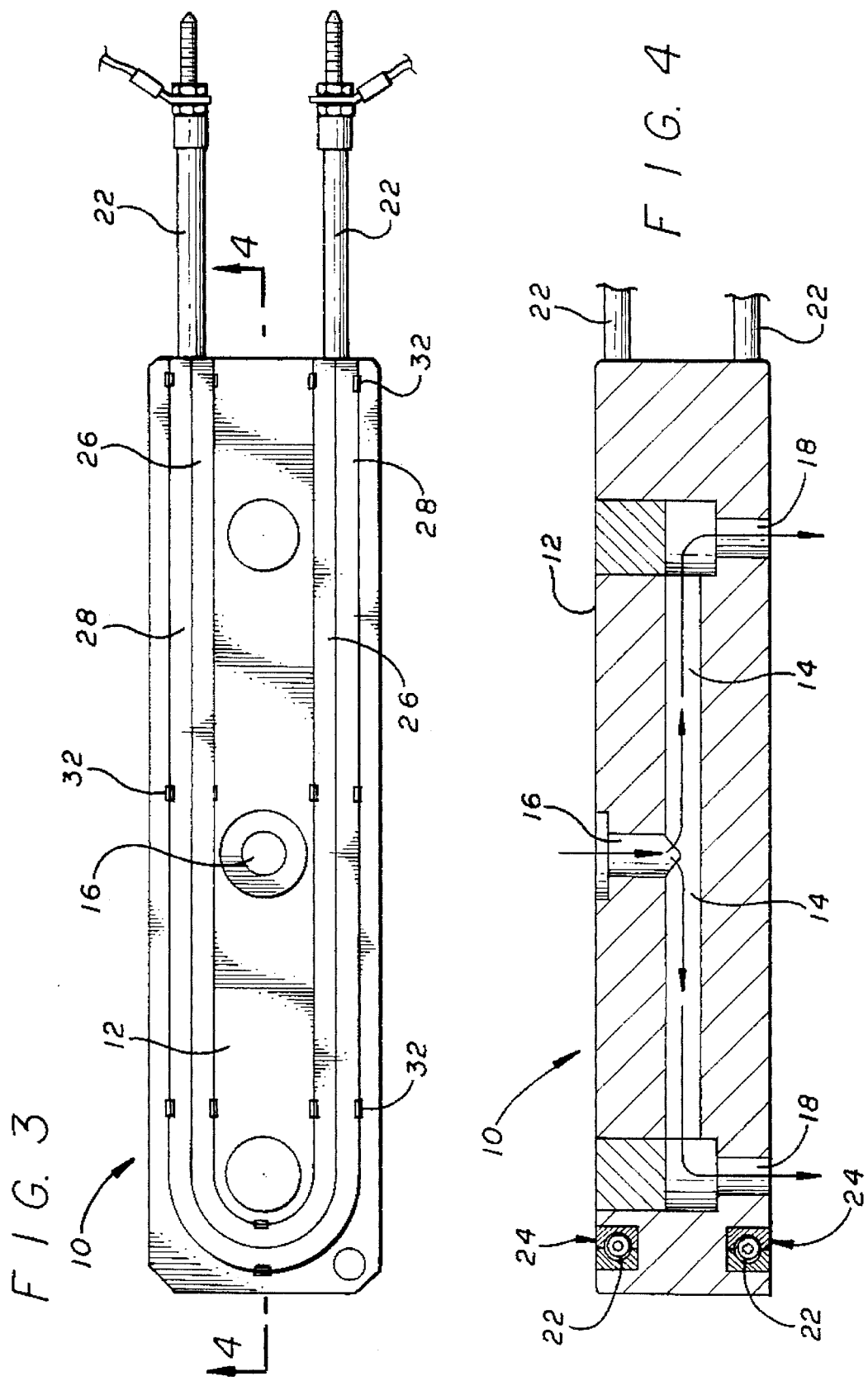

HEATER BLOCK FOR INJECTION MOLDING WITH REMOVABLE HEAT CONDUCTIVE MEMBER IN GROOVE IN HEATER BLOCK

This invention relates to heating assemblies which heat fluid flowing through passages in the assembly. More particularly, the invention relates to heating assemblies which provide an efficient transfer of heat to the fluid and in which the heater in the assembly can be easily replaced without damaging the assembly when the heater deteriorates or becomes defective. The heating assembly is especially adapted to be used to heat fluid which is injected into a cavity of a mold to form an article corresponding to the shape of the mold when the fluid solidifies.

Fluid is often injected into a cavity to mold an article in a shape defined by the cavity. The fluid is heated before injection into the cavity to insure that the fluid will be relatively viscous when inserted into the cavity. This insures that the fluid will completely fill the cavity and will accurately conform to the shape of the cavity when it solidifies.

Apparatus has been in existence for decades for heating the fluid before the fluid is injected into the cavity. Such apparatus includes a heating block which holds a heater for receiving an electrical current to heat the heater. The heater and the heating block are made from heat conductive materials. This provides for a transfer of the heat from the heater to fluid in a passage in the heating block. The fluid is injected into a cavity in a mold after flowing through the passage and being heated during such flow. In this way, the fluid fills the cavity in the mold and produces a product having a shape corresponding to the shape of the cavity in the mold when the fluid solidifies.

The apparatus described in the previous paragraph is quite expensive. For example, it can cost in the hundreds and even thousands of dollars. Furthermore, the heater in such apparatus often deteriorates or becomes defective with extended usage. Because of the cost of the apparatus, it would be desirable to replace the heater without damaging the apparatus holding the heater when the heater deteriorates or becomes defective.

The problem discussed in the previous paragraph has been known for many years. Considerable thought and effort have been devoted to resolving the problem satisfactory. However, in spite of such thought and effort, a satisfactory resolution of the problem has not been provided. Heating apparatus often becomes damaged when an attempt is made to replace a deteriorated or defective heater.

This invention provides apparatus in which a deteriorated or defective heater can be easily replaced without damaging the apparatus. In one embodiment of the invention, a heating block made from a heat conductive material has a passage through which a fluid can flow. The fluid is heated by the heater as it flows through the block passage. A groove preferably having a looped configuration extends into the block from a peripheral surface in the block. A heater made from an electrically conductive and heat conductive material is disposed in the groove, preferably in a looped configuration corresponding to the looped configuration of the groove.

A heat conductive member disposed in the groove is provided with a hole to receive the heater in an enveloping relationship. The member may be defined by a pair of separable portions. The member is preferably disposed in the looped relationship in the groove. The heating block may be locally deformed to hold the member.

The heater may deteriorate or become defective with extended usage and may have to be replaced. To accomplish this, the heater and the member may be removed as a unit from the block after removing the deformation. The portions in the member are separated to remove the heater. A new heater may then be disposed between the split portions which may then be abutted. The member and the heater may then be disposed as a unit in the groove and the local deformation may be reinstated in the block to retain the member and the heater in a fixed relationship with the block.

In the drawings:

FIG. 3 is a top plan view of the heater assembly shown in FIGS. 1 and 2;

FIG. 4 is a sectional view taken substantially on the line 4—4 of FIG. 3; and

Figure 1:
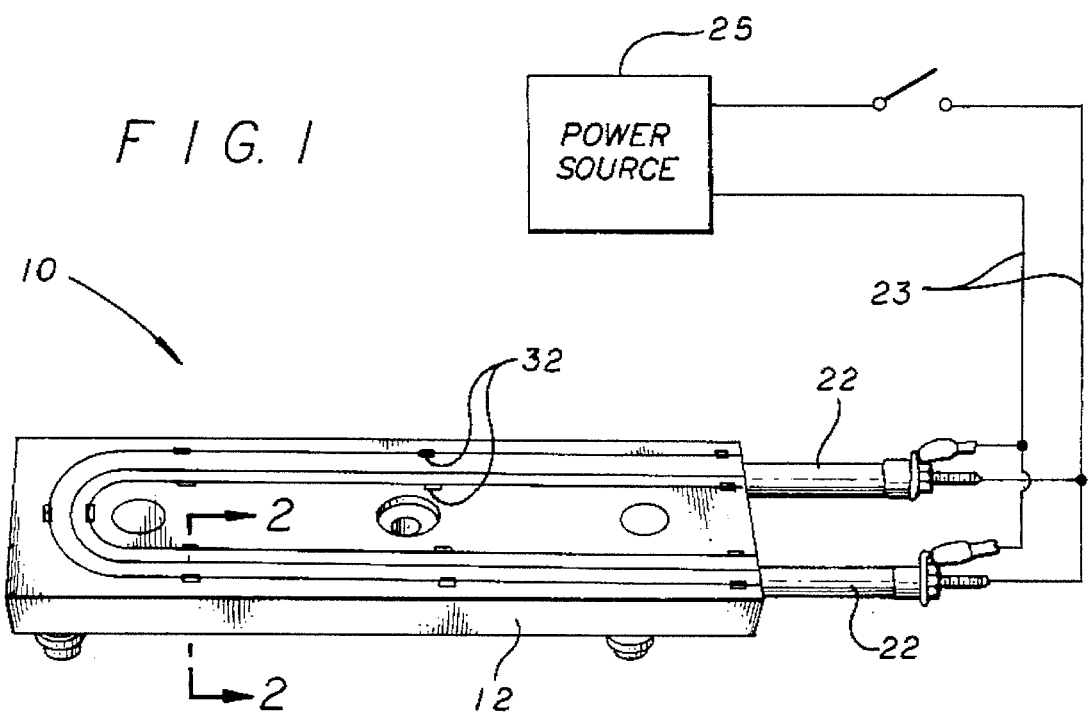
FIG. 1 is a perspective view of a heater assembly constituting one embodiment of the invention.
Figure 2:
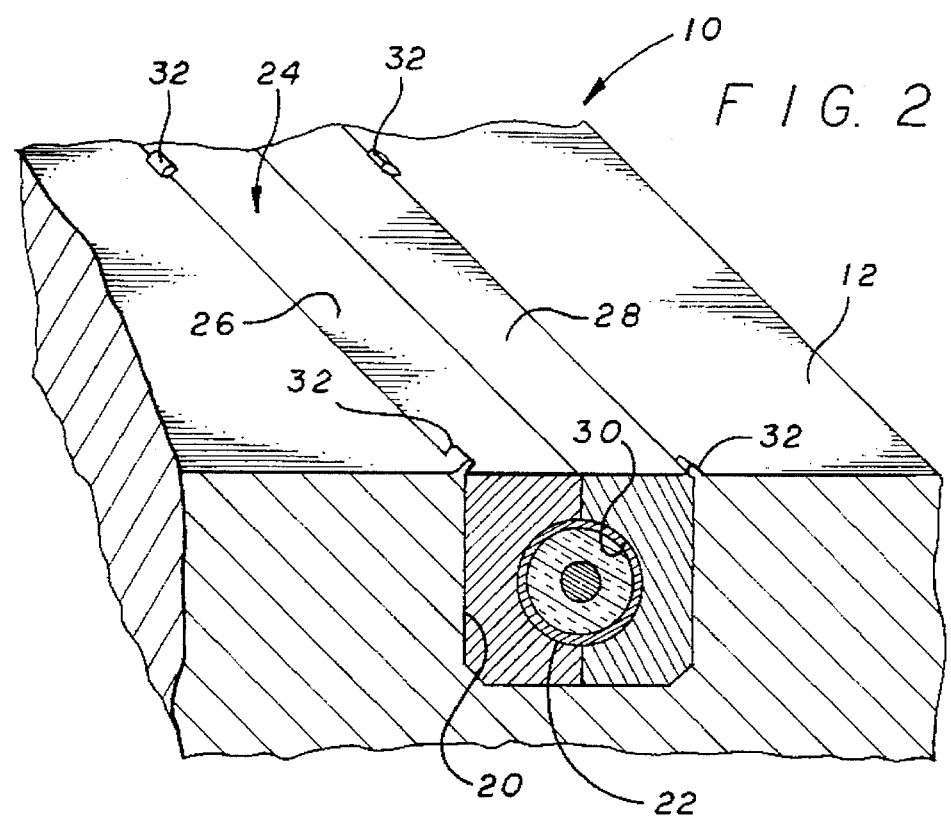
FIG. 2 is an enlarged fragmentary perspective view taken in section on the line 2—2 of FIG. 1.
Figure 5:
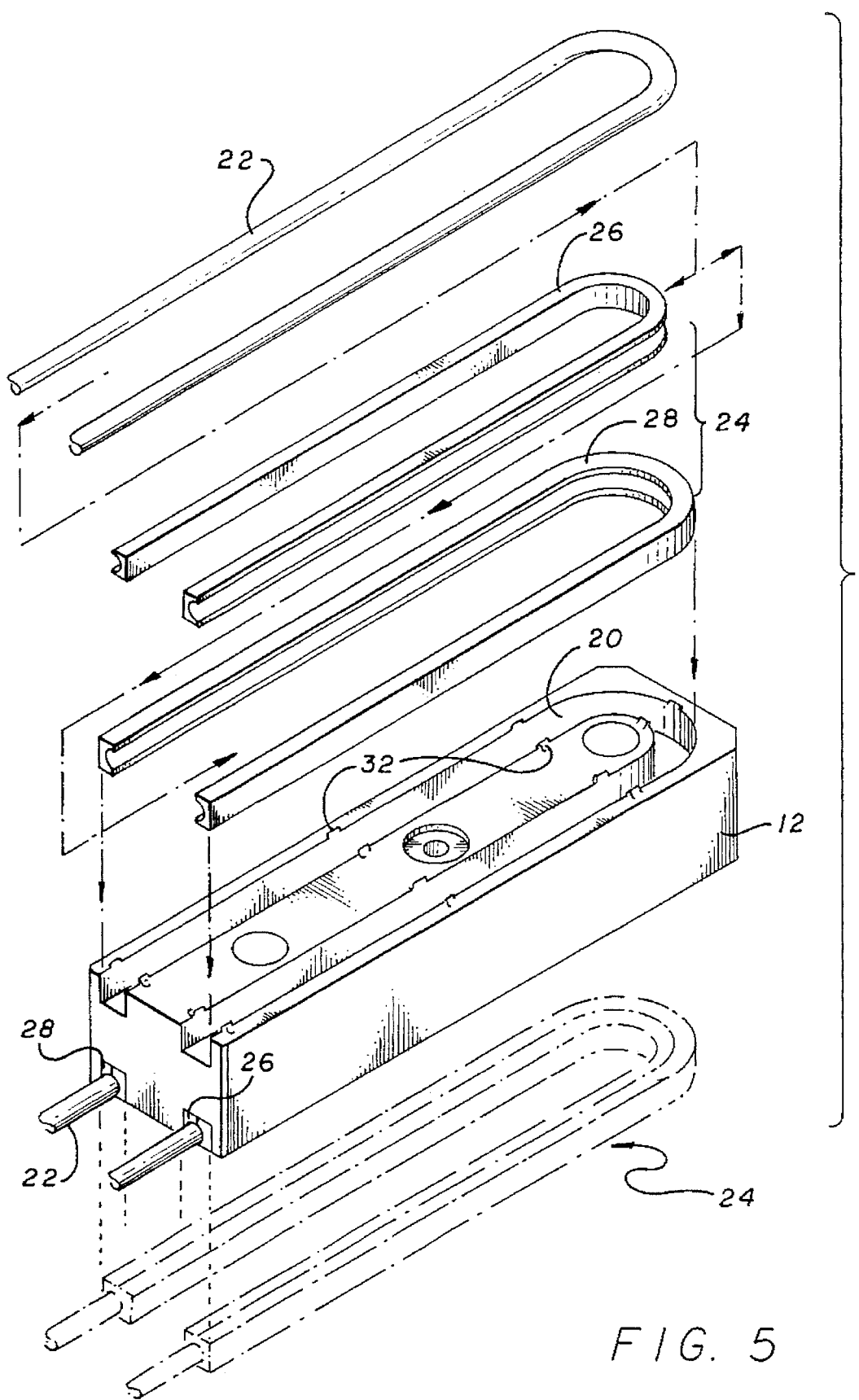
FIG. 5 is an exploded perspective view of certain elements of the heater assembly shown in the previous.

In one embodiment of the invention, apparatus generally indicated at 10 includes a heating block 12 for heating a fluid as the fluid flows through a passage 14 (FIG. 4) in the heating block. The heating block 12 is made from a suitable material such as a steel having good heat conducting properties. The fluid flows into the passage 14 through an inlet 16 and from the passage through an outlet or outlets 18. The direction of the fluid flow is indicated by arrows in FIG. 4. Preferably the fluid is inserted from the outlet 18 into a hollow mold (not shown) having a cavity of a particular configuration. The fluid fills the cavity and forms an object of a particular configuration when it solidifies. Injection molding such as described above is well known in the art.

The block 12 has a groove 20. Preferably the groove is disposed on the external periphery of the block 12. Preferably the groove 20 has a looped configuration such as a U-shaped configuration. A heater 22 is disposed in the groove 20 and is preferably provided with a looped configuration corresponding to the looped configuration of the groove. The heater 22 is preferably made from a suitable material such as steel having good characteristics of conducting an electrical current and of conducting heat. Electrical leads 23 may connect the opposite terminals of the heater 22 to a power source 25.

A positioning member generally indicated at 24 may be disposed in the groove 20 in a snug relationship with the walls of the groove. The positioning member may be made from a suitable material with heat conducting properties such as copper. The positioning member 24 may be formed from a pair of divided elements 26 and 28. The divided elements 26 and 28 may abut each other to define a hole 30. The heater 22 extends through the hole 30. Deformations 32 are made into the block 12 at spaced positions on the block adjacent to the member 24. These deformations may be made by staking the block 12 at the spaced positions.

When the heater 22 is heated as by an electrical current, the heat is transferred efficiently from the heater to the positioning member 24 and then to the block 12. This causes the block 12 to become heated and to pass the heat to the fluid in the passage 14. In this way, the fluid becomes heated as it flows through the passage 14. This allows the fluid to pass easily and efficiently into the cavity in the mold (not shown) to form an object with the configuration of the mold.

The heater 22 may deteriorate or become defective with extended usage. When this occurs, the leads 23 are disconnected from the heater 22. The deformations 32 are then removed from the heating block 12. The positioning member 24 and the heater 22 are then removed as a unit from the groove 20. The positioning member 24 is then separated into its two portions 26 and 28 and the heater 22 is removed.

A new heater 22 is then disposed between the separated portions 26 and 28 of the positioning member 24 and the portions 26 and 28 are disposed into abutting relationship against the heater. The positioning member 24 and the heater 22 are then inserted as a unit into the groove 20. The deformations 32 are then formed in the block 12 as by staking. The leads 23 are connected to the heater. The heating apparatus 10 is then ready to be used in heating fluid flowing through the passage 14.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for use in injecting a fluid into a mold, a heating block made from a heat conductive material, a heater, an externally disposed groove in the heating block for receiving the heater and for generating heat upon the passage of an electrical current through the heater, first means disposed in the groove in enveloping relationship to the heater and in a snug relationship with the groove for transferring heat from the heater to the heating block, the first means being removable with the heater from the heater groove without affecting the disposition of the heating block, the first means including a pair of abutting members disposed externally in the groove, the abutting members defining a hole in the abutting relationship for receiving the heater, second means in the heating block for retaining the first means and the heater in the heating block, and a passage in the heating block for a flow of the fluid through the heating block into the mold and for the heating of the fluid by the heater during such flow to obtain the production of an object having the configuration of the mold upon the solidification of the fluid in the mold, the second means being disposed at spaced intervals along the first means and constituting deformable stakes extending from the heating block over the first means.

2. In a combination as set forth in claim 1, the heater, the first means and the heater groove having a looped configuration and the heater extending from the heater block to facilitate electrical connections to the opposite ends of the heater.

3. In combination for use in injecting a fluid into a mold, a heating block made from a heat conductive material, a groove disposed externally in the heating block, a positioning member made from a material having heat conducting properties, the positioning member being disposed externally in the groove for the transfer of heat from the positioning member to the heating block, the positioning member being defined by a pair of divided elements in abutting relationship to each other, the divided elements being manually removable from the groove without affecting the disposition of the heating block and being separable from each other after their removal from the groove, the divided elements defining a hole when disposed in abutting relationship to each other, and a heater disposed in the hole with the divided elements in the groove and the heater being removable from the divided elements after the removal of the divided elements from the groove and the separation of the divided elements, means extending between the heating block and the positioning member for releasably retaining the positioning member in the groove.

4. In combination for use in injecting a fluid into a mold, a heating block made from a heat conductive material, a groove disposed externally in the heating block, a positioning member made from a material having heat conducting properties, the positioning member being disposed in the groove for the transfer of heat from the positioning member to the heating block, the positioning member being defined by a pair of divided elements in abutting relationship to each other, the divided elements being manually removable from the groove without affecting the disposition of the heating block and being separable from each other after their removal from the groove, each of the divided elements extending externally from the groove, the divided elements defining a hole when disposed in abutting relationship to each other, a heater disposed in the hole with the divided elements in the groove and the heater being removable from the divided elements after the removal of the divided elements from the groove and the separation of the divided elements, the groove having a looped configuration, the positioning member having a looped configuration corresponding to the looped configuration of the groove, and means extending between the heating block and the positioning member for releasably retaining the positioning member in the groove.

5. In combination for use in injecting a fluid into a mold, a heating block made from a heat conductive material, a groove disposed externally in the heating block, a positioning member made from a material having heat conducting properties, the positioning member being disposed in the groove for the transfer of heat from the positioning member to the heating block, the positioning member being defined by a pair of divided elements in abutting relationship to each other, the divided elements being manually removable from the groove without affecting the disposition of the heating block and being separable from each other after their removal from the groove, the divided elements defining a hole when disposed in abutting relationship to each other, and a heater disposed in the hole with the divided elements in the groove and the heater being removable from the divided elements after the removal of the divided elements from the groove and the separation of the divided elements, a passage in the heating block for passing the fluid through the heating block to heat the fluid, the divided elements being separable from each other, after the removal of the positioning member from the groove, to expose the heater, each of the divided elements having a surface abutting the surface in the other divided element when the divided elements are in the groove, the hole being provided at the abutting surfaces of the divided elements, the groove having a looped configuration, the positioning member having a looped configuration corresponding to the looped configuration of the groove, and means extending between the heating block and the positioning member for releasably retaining the positioning member in the groove.

6. In a combination as set forth in claim 5, the releasable retaining means constituting deformations extending in the heater block to the positioning member for releasably retaining the positioning member in the groove, each of the divided elements extending externally from the groove.

7. In combination for use in injecting a fluid into a mold, a heating block made from a heat conductive material, the heating block having a particular external surface defining an external periphery of the heating block, a groove in the heating block, the groove being defined by a pair of surfaces transverse to the particular external surface and extending to the particular external surface, a positioning member made from a material having heat conducting properties, the positioning member being disposed in the groove for the transfer of heat from the positioning member to the heating block, the positioning member being defined by a pair of divided elements each having an external surface extending substantially in the transverse direction to the external surface of the heating block, the divided elements having surfaces abutting each other in the groove and being separable after removal from the groove, the divided elements defining a hole at the abutting surfaces, the divided elements being removable from the groove without affecting the disposition of the heating block, a heater disposed in the hole with the divided elements in abutting relationship in the groove, the heater being removable from the divided elements, after the removal of the divided elements from the groove, to expose the heater, and means extending between the heating block and the positioning member to hold the positioning member in engaging but releasable relationship in the groove in the heating block.

8. In combination for use in injecting fluids, a heating block made from a heat conductive material, the heating block having a particular external surface defining an external periphery of the heating block, a groove in the heating block, the groove being defined by a pair of surfaces transverse to the particular external surface and extending to the particular external surface, a positioning member made from a material having heat conducting properties, the positioning member being disposed in the groove for the transfer of heat from the positioning member to the heating block, the positioning member being defined by a pair of divided elements each having an external surface extending substantially in the transverse direction, the divided elements having surfaces abutting each other in the groove and extending to the particular external surface of the heating block and being separable after removal from the groove, the divided elements defining a hole at the abutting surfaces, a heater disposed in the hole with the divided elements in abutting relationship in the groove, the heater being removable from the divided elements, after the removal of the divided elements from the groove, to expose the heater, a passage in the heating block for passing the fluid through the heating block into the mold to obtain the heating of the fluid by the heater for the production of an object having the configuration of the mold upon the solidification of the fluid in the mold, and deformations disposed on the heating block and having first and second positions and disposed in the first position in engaging relationship with the positioning member to retain the positioning member in the groove and movable to the second position to provide for a removal of the positioning member from the groove.

9. In a combination as set forth in claim 8, the groove having a looped configuration, and the positioning member having a looped configuration corresponding to the looped configuration of the groove.

10. In combination for use in injecting fluids into a mold, a heating block made from a heat conductive material, the heating block having a particular external surface defining an external periphery of the heating block, a groove in the heating block, the groove being defined by a pair of surfaces transverse to the particular external surface, a positioning member made from a material having heat conducting properties, the positioning member being disposed in the groove for the transfer of heat from the positioning member to the heating block, the positioning member being defined by a pair of divided elements each having an external surface extending substantially in the transverse direction, the divided elements having surfaces abutting each other in the groove and being separable after removal from the groove, the divided elements defining a hole at the abutting surfaces, and a heater disposed in the hole with the divided elements in abutting relationship in the groove, the heater being removable from the divided elements, after the removal of the divided elements from the groove, to expose the heater, each of the divided elements having a first surface abutting the first surface of the other divided element when the divided elements are in the groove and each of the divided elements having a second surface abutting an individual one of the transverse surfaces defining the groove when the divided elements are in the groove, a passage in the heating block for passing the fluid through the heating block into the mold to obtain the heating of the fluid by the heater for the production of an object having the configuration of the mold upon the solidification of the fluid in the mold, and means extending between the heating block and the positioning member to hold the positioning member in engaging but releasable relationship in the groove in the heating block.

11. In combination for use in injecting fluids, a heating block made from a heat conductive material and having an external periphery, a passage in the heating block for passing the fluid through the heating block into the mold to obtain the heating of the fluid by the heater for the production of an object having the configuration of the mold upon the solidification of the fluid in the mold, a groove in the external periphery of the heating block, a heater disposed in the groove and made from heat conductive material to transfer heat to the heating block in accordance with the generation of heat in the heater, and means including a pair of abutting members disposed in the groove and extending externally from the groove in the block and made from a heat conductive material and enveloping the heater and removable with the heater from the groove without affecting the disposition of the heating block and constructed to facilitate access to the heater after removal of such abutting members and the heater from the groove, the heater being constructed to generate heat for transfer to the abutting members and the heating block.

12. In a combination as set forth in claim 11, the abutting members being separable from each other to facilitate access to the heater after the removal of the abutting members and the heater from the groove without affecting the disposition of the heating block.

13. In a combination as set forth in claim 11, the groove having a looped configuration in the heating block, and the heater and the abutting members having looped configurations corresponding to the looped configuration of the groove.

14. In a combination as set forth in claim 13 including means deformably extending from the heating block over the abutting members for retaining the heater and the enveloping means in the groove.

15. In a combination as set forth in claim 14, means connected to the heater for applying electrical power to the heater to heat the heater.

16. In combination for use in injecting fluids, a heating block made from a heat conductive material and having an external periphery, a heater, a groove in the external periphery of the heating block for receiving the heater and for generating heat upon the passage of an electrical current through the heater, first means including a pair of abutting members made from a heat conducting material and extending externally from the groove in the external periphery of the heating block and disposed in the groove in enveloping relationship to the heater and in a snug relationship with the groove for transferring heat from the heater to the heating block, the pair of abutting members being removable with the heater from the heater groove without affecting the disposition of the heating block, second means in the heating block for retaining the first means and the heater in the heating block, and a passage in the heating block for a flow of the fluid through the heating block into the mold and for the heating of the fluid during such flow to obtain the production of an object having the configuration of the mold upon the solidification of the fluid in the mold, the heater being constructed to receive an electrical current for generating heat in the heater for transfer to the first means and the heating block.

17. In a combination as set forth in claim 16, the pair of abutting members being separable from each other upon the removal of the abutting members from the groove to facilitate the removal of the heater from the abutting members upon the removal of the heater and the abutting members from the heater groove in the heating block without affecting the disposition of the heating block.

18. In a combination as set forth in claim 16, the abutting members defining a hole through which the heater extends when the members abut each other and the abutting members being separable from each other when the abutting members are removed from the groove.

19. In a combination as set forth in claim 16, means connected to the heater for applying electrical power to the heater to heat the heater.

20. In combination for use in injecting fluids, a heating block made from a heat conductive material and having an external periphery, a groove in the external periphery of the heating block, a positioning member made from a material having heat conducting properties, the positioning member being disposed in the groove for the transfer of heat from the positioning member to the heating block and extending from the groove to the periphery of the heating block, the positioning member being defined by a pair of divided elements in abutting relationship to each other, the divided elements being manually removable from the groove without affecting the disposition of the heating block and being separable from each other after their removal from the groove, the divided elements defining a hole when disposed in abutting relationship to each other, and a heater disposed in the hole with the divided elements in the groove and the heater being removable from the divided elements after the removal of the divided elements from the groove and the separation of the divided elements, the heater being constructed to receive an electrical current for generating heat for transfer to the positioning member and the heating block.

21. In a combination as recited in claim 20, the divided elements being separable from each other, after the removal of the divided elements from the groove without affecting the disposition of the heating block, to expose the heater.

22. In a combination as recited in claim 20, a passage in the heating block for passing the fluid through the heating block into the mold to heat the fluid for the production of an object having the configuration of the mold upon the solidification of the fluid in the mold.

23. In a combination as set forth in claim 22, the divided elements being separable from each other, after the removal of the positioning member from the groove, to expose the heater, each of the divided elements having a surface abutting the surface in the other divided element when the divided elements are in the groove and each of the divided elements extending externally from the groove, and the hole being provided at the abutting surfaces of the divided elements.

24. In a combination as recited in claim 20, each of the divided elements having a surface abutting the surface in the other divided element when the divided elements are in the groove and each of the divided elements extending externally from the groove, and the hole being provided at the abutting surfaces of the divided elements.

25. In a combination as set forth in claim 20, the groove having a looped configuration, and the positioning member having a looped configuration corresponding to the looped configuration of the groove.

26. In combination for use injecting fluids, a heating block made from a heat conductive material, the heating block having a particular external surface defining an external periphery of the heating block, a groove in the external periphery of the heating block, the groove being defined by a pair of surfaces transverse to the particular external surface, a positioning member made from a material having heat conducting properties, the positioning member being disposed in the groove for the transfer of heat from the positioning member to the heating block and extending externally from the groove, the positioning member being defined by a pair of divided elements each having an external surface extending substantially in the transverse direction, the divided elements having surfaces abutting each other in the groove and being separable after removal from the groove without affecting the disposition of the heating block, the divided elements defining a hole at the abutting surfaces, and a heater disposed in the hole with the divided elements in abutting relationship in the groove, the heater being removable from the divided elements, after the removal of the divided elements from the groove, to expose the heater, the heater being constructed to receive an electrical current for generating heat for transfer to the positioning member and the heating block.

27. In a combination as set forth in claim 26, a passage in the heating block for passing the fluid through the heating block into the mold to heat the fluid for the production of an object having the configuration of the mold upon the solidification of the fluid in the mold.

28. In combination for use injecting fluids, a heating block made from a heat conductive material, the heating block having a particular external surface defining an external periphery of the heating block, a groove in the heating block, the groove being defined by a pair of surfaces transverse to the particular external surface of the heating block and extending to the particular external surface of the heating block, a positioning member made from a material having heat conducting properties, the positioning member being disposed in the groove for the transfer of heat from the positioning member to the heating block, the positioning member being defined by a pair of divided elements each having an external surface extending substantially in the transverse direction, the divided elements having surfaces abutting each other in the groove and being separable after removable from the groove without affecting the disposition of the heating block, the divided elements defining a hole at the abutting surfaces, and a heater disposed in the hole with the guided elements in abutting relationship in the groove, the heater being removable from the divided elements, after the removal of the divided elements from the groove, to expose the heater, each of the divided elements having a first surface abutting the first surface of the other divided element when the divided elements are in the groove and each of the divided elements having a second surface abutting an individual one of the transverse surfaces defining the groove when the divided elements are in the groove.

* * * * *